UNITED STATES PATENT OFFICE 2,647,935

METHOD OF VULCANIZING RUBBER AND PRODUCTS THEREOF

David J. Beaver, Richmond Heights, Mo., assignor to Monsanto Chemical Company, St. Louis, Mo., a corporation of Delaware No Drawing. Original application January 17, 1949, Serial No. 71,390, now Patent No. 2,582,670, dated January 15, 1952. Divided and this application November 14, 1951, Serial No. 256,360

6 Claims. (Cl. 260—788)

This invention relates to the vulcanization of rubber. More particularly it relates to the vulcanization of rubber with a new class of accelerators and to the vulcanized products resulting thereby.

In the compounding of rubber, both natural and synthetic, improvements have been constantly sought, particularly in respect to the more efficient and more economical use of vulcanization accelerators. While many accelerators, per se, produce vulcanizates having acceptable physical properties, it has long been known that by the incorporation into the compounded stock of accelerators such as dibutyl ammonium oleate and diphenyl guanidine phthalate in addition to other type accelerators, such as the thiazoles, greater ease in processing and a better vulcanizate is obtained. It has become customary to denote materials such as dibutyl ammonium oleate and diphenyl guanidine phthalate and the like as activators. Similarly, it is preferred to employ the new accelerators in conjunction with accelerators of other types as activators.

It is an object of this invention to provide a class of activators which are capable of assisting accelerators possessing inherent weaknesses, such as inefficient vulcanizing effect, limited solubility, and poor dispersibility in rubber stocks, thus causing uneven cures which in turn result in non-uniform properties and erratic performance in service. It is also an object of this invention to decrease the time of vulcanization. A further object is to provide a wider choice of curing conditions such that a series of combinations varying in scorch and curing properties may be obtained. For example, the ratio of activator to accelerator may vary depending upon the type of rubber, type of stock, temperature of cure, time of cure, the particular accelerator, and the objective of the compounder, i. e., whether a low or high modulus is desired or a short or long cure is required. Other objects will appear hereinafter.

It has been found in accordance with this invention that the above mentioned objects are substantially attained by vulcanizing a vulcanizable rubber stock in which has been incorporated a member of the group of compounds comprising amic acids, or half amides of dicarboxylic acids, and their salts of the following general formula

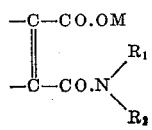

where M is hydrogen or a salt forming group such as a metal, ammonia, an amine, urea, and the like; where $R_1$ and $R_2$ are alkyl, aralkyl, and cycloalkyl groups such as methyl, ethyl, ethanol, 2-cyanoethyl, propyl, butyl, 2-cyanobutyl, amyl, benzyl, phenethyl, cyclohexyl, methyl cyclohexyl, and their various isomeric groups, carbamyl and hydrocarbon substituted carbamyl radicals, thiocarbamyl and hydrocarbon substituted thiocarbamyl radicals, and the like, and also either $R_1$ or $R_2$, but not both, may be hydrogen. The unsaturated group which links the two carbonyl carbon atoms may be part of an olefinic nucleus, as for example in maleamic acid and in dimethyl maleamic acid, or an aromatic nucleus, as for example in phthalamic acid and in naphthalamic acid, and their substituted analogues and homologues. Among the salt forming groups are the alkali- and alkaline-earth metals, zinc, magnesium, and the like, ammonia, methyl amine, ethyl amine, isopropyl amine, butyl amine, benzyl amine, cyclohexyl amine, dimethyl amine, diethyl amine, dipropyl amine, dibutyl amine, methyl propyl amine, N-methyl cyclohexylamine, dicyclohexylamine, dibenzyl amine, piperidine, trimethyl amine, triethyl amine, and the like.

Although amic acids and their salts of the above described general formula produce good results, the best results are obtained with phthalamic and maleamic acids, their metal salts, and their alkyl and cycloalkyl substituted amine salts, wherein at least one hydrogen atom of the amido nitrogen is replaced by an alkyl or cycloalkyl group. As specific examples of this group are N,N-dibutyl maleamic acid, N-cyclohexyl maleamic acid, N,N-dicyclohexyl maleamic acid, N-ethyl phthalamic acid, N-butyl phthalamic acid, N,N-diisopropyl phthalamic acid, N,N-dibutyl phthalamic acid, N,N-dicyclohexyl phthalamic acid, zinc salt of N-butyl maleamic acid, zinc salt of N-ethyl phthalamic acid, zinc salt of N-butyl phthalamic acid, zinc salt of N,N-dicyclohexyl phthalamic acid, isopropyl amine salt of N-isopropyl maleamic acid, butyl amine salt of N-butyl maleamic acid, dicyclohexyl amine salt of N,N-dicyclohexyl maleamic acid, ethyl amine salt of N-ethyl phthalamic acid, isopropyl amine salt of N-isopropyl phthalamic acid, butyl amine salt of N-butyl phthalamic acid, dicyclohexyl amine salt of N,N-dicyclohexyl phthalamic acid.

As illustrative of the preparation of the new activators is the following example but in nowise is it to be considered limitative thereof.

EXAMPLE I

A mixture containing 148.1 parts by weight (substantially 1 mol) of phthalic anhydride and 76.2 parts by weight (substantially 1 mol) of thiourea was heated in a suitable reaction vessel at a temperature of 140°–160° C. 218.8 parts by weight of a yellow pasty material developed believed to be crude thiophthaluric acid. This product was taken up with water and the solution made alkaline and filtered. Thereupon the filtrate was made acid with dilute hydrochloric acid and filtered. The pale yellow residue was dried and found to have a melting point of 180°–186° C. and a nitrogen content of 12.52% as compared to a theoretical nitrogen content of 12.50%.

As exemplary of the activating properties of the amic acid the following gum stocks were compounded comprising

| Stock | A | B |
| --- | --- | --- |
| Smoked sheets rubber_____parts by weight__ | 100 | 100 |
| Zinc oxide_____do____ | 35 | 35 |
| Sulfur_____do____ | 1.3 | 1.3 |
| Stearic acid_____do____ | 1.0 | 1.0 |
| Benzothiazyl disulfide_____do____ | 0.6 | 0.6 |
| Thiophthaluric acid of Example I_____do____ | 1.0 | _____ |

The above stocks so compounded were vulcanized in the usual manner by heating in a press for various periods of time at 142° C. The physical properties of the respective cured products are set forth below:

Table I

| | Min. cure at 142° C | Stock A | Stock B |
| --- | --- | --- | --- |
| 300% modulus | 10 | 120 p. s. i | no cure. |
| | 20 | 160 p. s. i | Do. |
| 500% modulus | 10 | 478 p. s. i | Do. |
| | 20 | 686 p. s. i | Do. |
| 700% modulus | 10 | 1,515 p. s. i | Do. |
| | 20 | 2,205 p. s. i | 358 p. s. i. |
| Ultimate tensile | 10 | 2,120 p. s. i | no cure. |
| | 20 | 2,623 p. s. i | 491 p. s. i. |
| Ultimate elongation | 10 | 785 percent | no cure. |
| | 20 | 753 percent | 763 percent. |

The data set forth in the above table show that the amic acid salts are a class of compounds which exert a marked activating effect on the cure rate and produce vulcanizates of high tensile strength in a short time. These new activators are readily compatible in rubber stocks, both natural and synthetic, and are non-toxic.

Obviously the amount of the new activators employed will vary outside the range of the specific example. For example as little as 0.2% on the rubber was found to exert an activating effect. Amounts higher than that specifically shown, as for example 2%, can be employed depending upon the conditions of compounding and the objectives of the compounder.

The amic acids and their salts of themselves possess vulcanization accelerator properties. For example, the following natural rubber stocks were compounded comprising

| Stock | C | D |
| --- | --- | --- |
| Smoked sheets rubber_____parts by weight__ | 100 | 100 |
| Zinc oxide_____do____ | 5 | 5 |
| Sulfur_____do____ | 3 | 3 |
| Stearic acid_____do____ | 1 | 1 |
| Ethyl amine salt of N-ethyl phthalamic acid_____do____ | 1.5 | _____ |
| Dicyclohexylamine salt of N,N-dicyclohexyl phthalamic acid_____do____ | _____ | 1.5 |

The above stocks so compounded were vulcanized in the usual manner by heating in a press for 60 and 90 minutes respectively at 142° C. and the following results were obtained on testing the cured rubber products.

Table II

| Stock | Minutes cure at 142° C. | Modulus of Elasticity in lbs./in.² at Elongations of— | | Ultimate Tensile, lbs./in.² | Ultimate Elongation, Percent |
| --- | --- | --- | --- | --- | --- |
| | | 500% | 700% | | |
| C | 60 | 543 | 2,225 | 2,738 | 745 |
| C | 90 | 547 | 2,037 | 2,037 | 700 |
| D | 60 | 433 | 1,805 | 2,475 | 780 |
| D | 90 | 527 | 2,290 | 3,070 | 750 |

By the term rubber as employed in the appended claims is meant natural as well as synthetic rubbers which are capable of vulcanization when heated with sulfur and includes latices and reclaims of such materials whether or not admixed with pigments, fillers, softeners, antioxidants, etc.

As exemplary of the activatable organic accelerators or primary accelerators are the mercaptothiazoles, mercaptoarylene thiazoles, thiuram mono and disulfides, the dithiocarbamates and their esters, the xanthates and other accelerators of different type than the amic acids.

While specific embodiments of the invention have been described herein, it will be understood that the invention is not so limited but that various modifications may be made therein without departing from the spirit of the invention or scope of the appended claims.

This application is a division of application Serial No. 71,390, filed January 17, 1949, now U. S. Patent No. 2,582,670, dated January 15, 1952.

What is claimed is:

1. The method of vulcanizing rubber which comprises heating a rubber and sulfur in the presence of a compound selected from the group consisting of acids of the structure

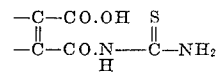

and salts thereof.

2. The method of vulcanizing rubber which comprises heating a rubber and sulfur in the presence of a compound of the structure

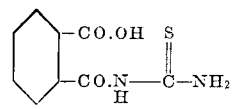

3. The method of vulcanizing rubber which comprises heating a rubber and sulfur in the presence of a thiazole accelerator and a compound of the structure

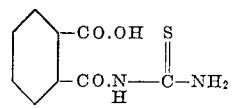

4. The vulcanized rubber product obtained by heating a rubber and sulfur in the presence of a compound selected from the group consisting of acids of the structure

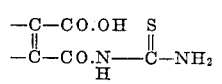

and salts thereof.

5. The vulcanized rubber product obtained by heating a rubber and sulfur in the presence of a compound of the structure

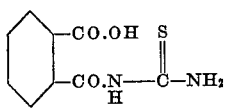

6. The vulcanized rubber product obtained by heating a rubber and sulfur in the presence of a thiazole accelerator and a compound of the structure

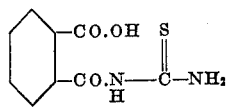

DAVID J. BEAVER.

References Cited in the file of this patent

UNITED STATES PATENTS

| Number | Name | Date |
| --- | --- | --- |
| 2,582,732 | Zerbe | Jan. 15, 1952 |